US012209727B2

(12) United States Patent
Gong et al.

(10) Patent No.: US 12,209,727 B2
(45) Date of Patent: Jan. 28, 2025

(54) OPTICAL ASSEMBLY MOUNTING STRUCTURE, VEHICLE LAMP LIGHTING DEVICE, VEHICLE LAMP, AND VEHICLE

(71) Applicant: Hasco Vision Technology Co., Ltd., Shanghai (CN)

(72) Inventors: Weigang Gong, Shanghai (CN); Zhiping Qiu, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/278,963

(22) PCT Filed: Mar. 11, 2021

(86) PCT No.: PCT/CN2021/080173
§ 371 (c)(1),
(2) Date: Aug. 25, 2023

(87) PCT Pub. No.: WO2022/188089
PCT Pub. Date: Sep. 15, 2022

(65) Prior Publication Data

US 2024/0295301 A1 Sep. 5, 2024

(51) Int. Cl.
*F21S 41/29* (2018.01)
*F21S 41/143* (2018.01)
(Continued)

(52) U.S. Cl.
CPC ........... *F21S 41/295* (2018.01); *F21S 41/143* (2018.01); *F21S 41/25* (2018.01); *F21S 45/47* (2018.01)

(58) Field of Classification Search
CPC ........ F21S 41/295; F21S 41/143; F21S 41/25; F21S 45/47; B60Q 3/50; F21V 17/06; F21V 17/104; F21V 29/70
See application file for complete search history.

(56) References Cited

U.S. PATENT DOCUMENTS 10,337,684 B2 * 7/2019 Joerg ...................... F21S 41/27
11,668,446 B2 * 6/2023 Berrezai ................ F21S 41/27
362/520
(Continued)

FOREIGN PATENT DOCUMENTS

CN 108613113 A 10/2018
CN 108692264 A 10/2018
(Continued)

OTHER PUBLICATIONS

International Search Report and Written Opinion, PCT/CN2021/080173, Jun. 10, 2021, 12 pgs.

*Primary Examiner* — Tsion Tumebo
(74) *Attorney, Agent, or Firm* — Volpe Koenig

(57) ABSTRACT

An optical assembly mounting structure comprising a primary optical element, a lens mount, a circuit board, and a radiator. Mounting portions on two sides of the primary optical element; each mounting portion comprising a front fitting portion and a rear fitting portion; a primary element limiting frame on the lens mount; the radiator has two C-shaped limiting structures opposite to each other; the circuit board has two C-shaped positioning grooves; the circuit board mounted on the radiator via a fitting between the C-shaped positioning grooves and the C-shaped limiting structures; rear ends of the primary optical element mounted on the radiator via a fitting between the rear fitting portions and the C-shaped limiting structures; front ends are mounted on the lens mount via the fitting between the front fitting
(Continued)

portions and the primary element limiting frame. Also, a lighting device comprising the mounting structure, a vehicle lamp, and a vehicle.

20 Claims, 10 Drawing Sheets

(51) Int. Cl.
*F21S 41/25* (2018.01)
*F21S 45/47* (2018.01)

(56) References Cited

U.S. PATENT DOCUMENTS

| | | | | |
|---|---|---|---|---|
| 2008/0106897 | A1* | 5/2008 | Yoon | G02B 3/0056 359/628 |
| 2012/0081619 | A1* | 4/2012 | Shimizu | G02B 19/0061 348/790 |
| 2014/0098539 | A1* | 4/2014 | Inaba | F21S 41/295 362/277 |

FOREIGN PATENT DOCUMENTS

| | | | |
|---|---|---|---|
| CN | 208475096 | U | 2/2019 |
| CN | 209622695 | U | 11/2019 |
| CN | 209857001 | U | 12/2019 |
| CN | 209893297 | U | 1/2020 |
| CN | 211203922 | U | 8/2020 |
| KR | 101339161 | B1 | 12/2013 |
| KR | 20140107950 | A | 9/2014 |
| WO | 2020/233297 | A1 | 11/2020 |

* cited by examiner

OPTICAL ASSEMBLY MOUNTING STRUCTURE, VEHICLE LAMP LIGHTING DEVICE, VEHICLE LAMP, AND VEHICLE

This application is a 35 U.S.C. § 371 national stage application of international application No. PCT/CN2021/080173, which was filed Mar. 11, 2021, is titled OPTICAL ASSEMBLY MOUNTING STRUCTURE, VEHICLE LAMP LIGHTING DEVICE, VEHICLE LAMP, AND VEHICLE, and is incorporated herein by reference as if fully set forth.

FIELD OF THE INVENTION

The present disclosure relates to a vehicle lamp, and particularly relates to an optical assembly mounting structure. The present disclosure also relates to a vehicle lamp lighting device, a vehicle lamp and a vehicle.

BACKGROUND OF THE INVENTION

Vehicle lamps exhibit a significant trend towards miniaturization at present, which requires a more simplified and integrated structure of a lamp module, and a more compact arrangement of components of the lamp module.

With miniaturization and flattening of the styling of the vehicle lamp, there are increasingly demands on small vehicle lamp lighting devices in the market. A small vehicle lamp lighting device generally refers to a vehicle lamp in which the greatest one of a length, width and height of a lighting device is less than or equal to 130 mm, wherein the smaller one of a length and width of a light-emitting surface of a lens or an optical element with other light-emitting forms is less than or equal to 20 mm. Some small vehicle lamps require the greatest one of the length, width and height of the lighting device to be less than or equal to 110 mm, and require the smaller one of the length and width of the light-emitting surface of the light-emitting optical element to be less than or equal to 10 mm. The small vehicle lamp lighting device has more compact components and has higher requirements on position accuracy of optical components. The existing optical assembly mounting structure has not been able to adapt to the demands of the development trend for miniaturization of vehicle lamps today, and there is no accurate and reliable overall mounting structure for optical assemblies of a miniaturized lighting device, and there is an urgent need in the market for an optical assembly mounting structure that is simplified, reliable and highly accurate in positioning for a miniaturized vehicle lamp.

SUMMARY OF THE INVENTION

The technical problem to be solved by the present disclosure is to provide an optical assembly mounting structure, which is highly accurate in positioning, simplified in mounting, and reliable. The technical problem further to be solved by the present disclosure is to provide a vehicle lamp lighting device, which has simple structure, high optical assembly positioning precision, and reliable mounting.

The technical problem further to be solved by the present disclosure is to provide a vehicle lamp, which is small in size and accurate and stable in lighting shape position.

The technical problem to be solved by the present disclosure is to provide a vehicle having a vehicle lamp with small size and accurate and stable lighting shape.

In order to solve the above technical problems, the present disclosure in an aspect provides an optical assembly mounting structure, including a primary optical element, a lens mount, a circuit board and a radiator. Mounting portions are disposed on two sides of the primary optical element, and the mounting portions include front fitting portions located at front ends and rear fitting portions located at rear ends. Primary element limiting frames are disposed in the lens mount. Two C-shaped limiting structures disposed oppositely are disposed on the radiator, and two C-shaped positioning grooves are formed in the circuit board. The circuit board is mounted on the radiator by fitting of the C-shaped positioning grooves and the C-shaped limiting structures. A rear end of the primary optical element is mounted on the radiator by fitting of the rear fitting portions and the C-shaped limiting structures, and a front end of the primary optical element is mounted on the lens mount by fitting of the front fitting portions and the primary element limiting frames.

Preferably, two primary element limiting frames are provided, and the two primary element limiting frames are disposed on two sides of the lens mount separately. Support grooves are formed in rear ends of the primary element limiting frames relative to positions of the front fitting portions, and the front fitting portions are mounted on the support grooves. In this preferred technical solution, stable fitting between the front end of the primary optical element and the lens mount may be formed by fitting of the support grooves in the primary element limiting frames on the two sides and the front fitting portions on the mounting portions of two sides of the primary optical element.

Further preferably, each support groove includes an on-groove contact surface, an in-groove contact surface and an under-groove contact surface. The front fitting portion includes a front upper fitting surface, a front-end fitting surface and a front lower fitting surface. The front upper fitting surface is in contact with the on-groove contact surface, the front-end fitting surface is in contact with the in-groove contact surface, and the front lower fitting surface is in contact with the under-groove contact surface. By this preferred technical solution, stable fitting and accurate positioning may be formed between the front fitting portions and the support grooves, such that mounting stability and mounting precision of the front end of the primary optical element on the lens mount are higher.

Further, each front fitting portion further includes a side stopper that is positioned on the outsides the primary element limiting frame and is in contact with the primary element limiting frame. By this preferred technical solution, the front fitting portion may be positioned in a left-right direction, further improving the positioning accuracy of the primary optical element.

Preferably, an outer side of each C-shaped limiting structure includes an upper circuit board limiting surface, an outer circuit board limiting surface and a lower circuit board limiting surface. Each C-shaped positioning groove includes a positioning groove upper portion, a positioning groove side portion and a positioning groove lower portion. The upper circuit board limiting surface is in contact with an upper side wall of the positioning groove upper portion, the outer circuit board limiting surface is in contact with an outer side wall of the positioning groove side portion, and the lower circuit board limiting surface is in contact with a lower side wall of the positioning groove lower portion. In this preferred technical solution, the circuit board is positioned by the three fitting surfaces between the outer side surface of each C-shaped positioning groove and the outer side surface of each C-shaped positioning structure, so that the positioning stability and the positioning accuracy are higher.

Further preferably, the radiator is provided with a circuit board contact surface. The C-shaped limiting structures are disposed on the circuit board contact surface, and the circuit board is in contact with the circuit board contact surface. In this preferred technical solution, due to contact between the circuit board and the circuit board contact surface, on the one hand, the circuit board and a light source mounted on the circuit board are in close contact with the radiator, thereby improving the heat dissipation effect of the light source. On the other hand, backward positioning of the circuit board is formed, improving the positioning accuracy of the circuit board and the light source mounted on the circuit board.

Preferably, an inner side of each C-shaped limiting structure includes an upper element limiting surface, an outer element limiting surface and a lower element limiting surface. Each rear fitting portion includes a rear upper fitting surface, a rear-side fitting surface, a rear lower fitting surface, and a rear-end fitting surface. The rear upper fitting surface is in contact with the upper element limiting surface, and the rear-side fitting surface is in contact with the outer element limiting surface. The rear lower fitting surface is in contact with the lower element limiting surface, and the rear-end fitting surface is in contact with the circuit board. By this preferred technical solution, multi-directional positioning of the rear fitting portion is formed, stable fitting of the primary optical element and the radiator is formed, and positioning accuracy between the rear end of the primary optical element and the circuit board and between the rear end of the primary optical element and the radiator is effectively improved.

Preferably, the lens mount includes a lens mounting opening at which a lens is fixedly connected. In this preferred technical solution, the mounting position of the lens on the lens mount is fixed by fitting between the lens mounting opening and the lens, thereby defining the relative position between the lens and the primary optical element and between lens and the light source, and guaranteeing the positioning accuracy between the lens and the primary optical element.

Further preferably, the lens and the lens mount are integrally formed. The positioning accuracy and the stability of the position of the lens are further guaranteed by this preferred technical solution.

Preferably, the lens mount includes positioning pins. The circuit board is provided with circuit board positioning holes. The positioning pins are mounted in the circuit board positioning holes. Accurate positioning between the lens mount and the circuit board is guaranteed by this preferred technical solution, and fitting precision between the lens and the primary optical element and between the lens and the light source is guaranteed by positioning the circuit board and the radiator.

The present disclosure in a second aspect provides a vehicle lamp lighting device using the optical assembly mounting structure provided in the first aspect of the present disclosure.

The present disclosure in a third aspect provides a vehicle lamp in which the vehicle lamp lighting device provided in the second aspect of the present disclosure is used.

The present disclosure in a fourth aspect provides a vehicle using the vehicle lamp provided in the third aspect of the present disclosure.

Due to the above technical solutions, and according to the optical assembly mounting structure of the present disclosure, the accurate positioning between the circuit board and the radiator is formed by the fitting of the two C-shaped positioning grooves and the two C-shaped positioning structures. Accurate positioning between the primary optical element and the radiator is formed by the fitting between the rear fitting portions and the C-shaped limiting structures. Accurate positioning between the primary optical element and the lens mount is formed by the fitting between the front fitting portions and the primary element limiting frames. According to the optical assembly mounting structure of the present disclosure, the positioning structure is simple, the mounting and fitting of optical assemblies with smaller volumes may be guaranteed, and the positioning accuracy and positioning stability of the light source and the primary optical element are higher. The setting that the inner side and outer side of each C-shaped limiting structure respectively fit with and are positioned with the primary optical element and the circuit board improves the stress condition of the C-shaped limiting structure, and further guarantees the positioning stability and accuracy. The structure of fitting of the fitting surfaces between the front fitting portions and the primary element limiting frames, between the rear fitting portions and the C-shaped limiting structures and between the rear fitting portions and the circuit board guarantees the positioning accuracy and the positioning stability of the front end and the rear end of the primary optical element. The fixed connection of the lens at the lens mounting opening, and the fitting of the positioning pins of the lens mount and the circuit board positioning holes further guarantee the positioning accuracy between the lens and the primary optical element and between the lens and the light source. According to the vehicle lamp lighting device of the present disclosure, the positioning structure is simple, the volume of the vehicle lamp lighting device may be set to be smaller, and the positioning accuracy and the positioning stability of the optical assembly are higher. The vehicle lamp and the vehicle of the present disclosure also have the above-mentioned advantages due to the use of the vehicle lamp lighting device and the vehicle lamp of the present disclosure.

Other features and technical effects of the present disclosure will be further described below in the specific embodiments.

DESCRIPTION OF REFERENCE NUMERALS

Figure 1:
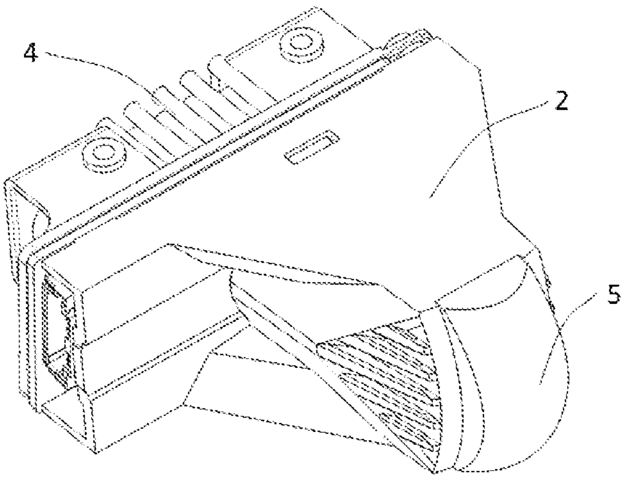
FIG. 1 is a schematic diagram showing an assembly state of an optical assembly mounting structure in an embodiment according to the present disclosure.
Figure 2:
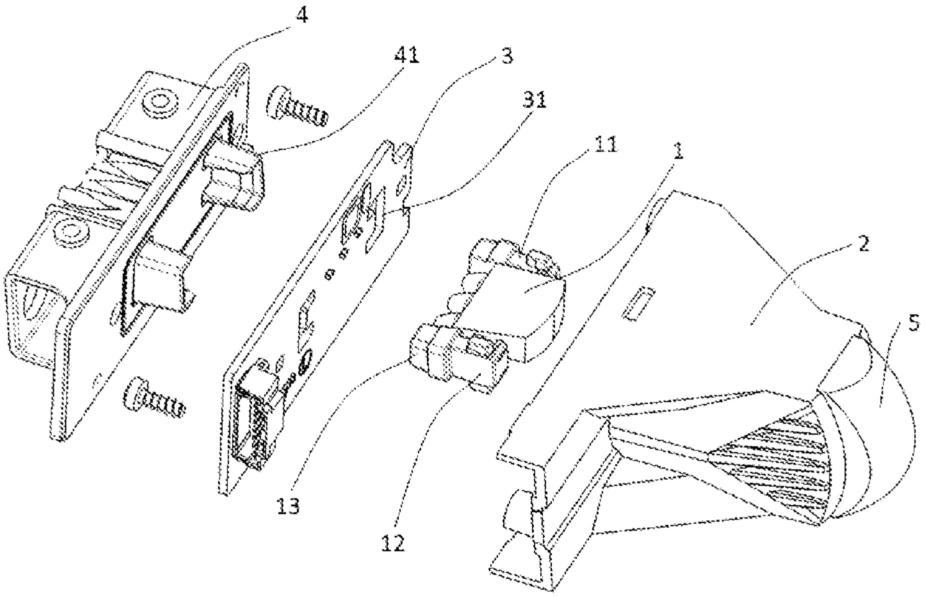
FIG. 2 is an exploded view of an optical assembly mounting structure in an embodiment according to the present disclosure.
Figure 3:
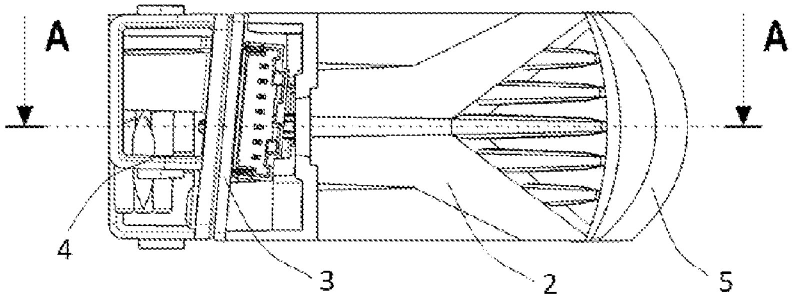
FIG. 3 is a right side view of an optical assembly mounting structure in an embodiment according to the present disclosure.
Figure 4:
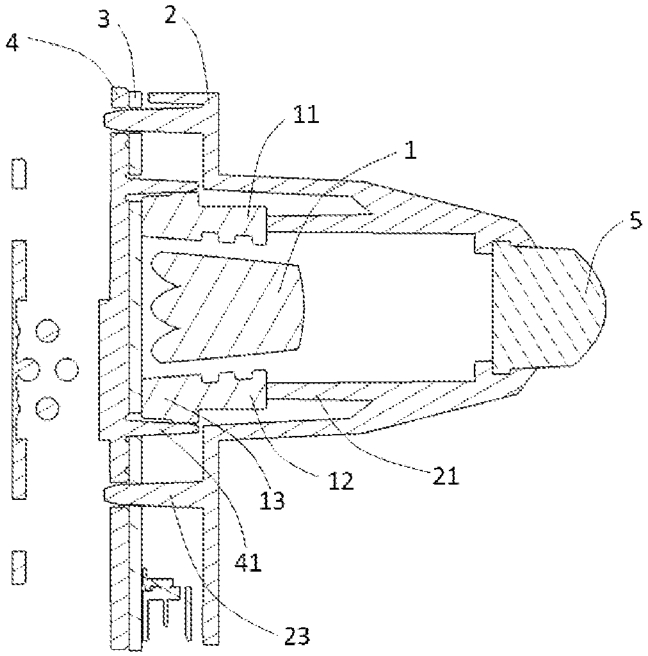
FIG. 4 is a section view in a direction A-A of FIG. 3.
Figure 5:
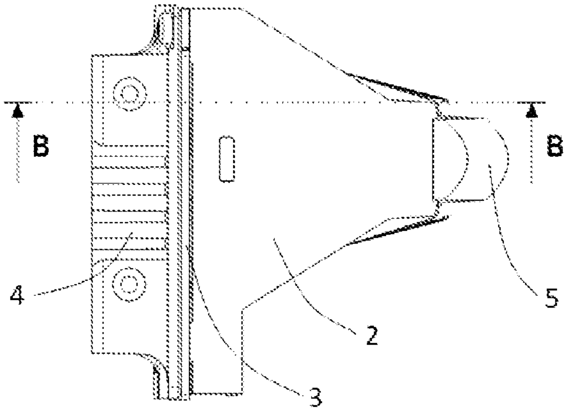
FIG. 5 is a top view of an optical assembly mounting structure in an embodiment according to the present disclosure.
Figure 6:
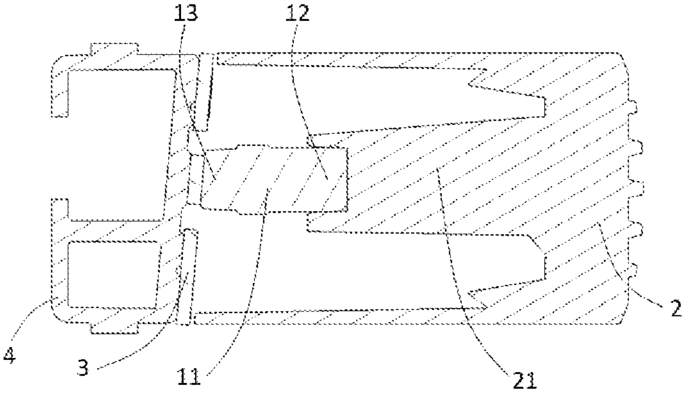
FIG. 6 is a section view in a direction B-B of FIG. 5.
Figure 7:
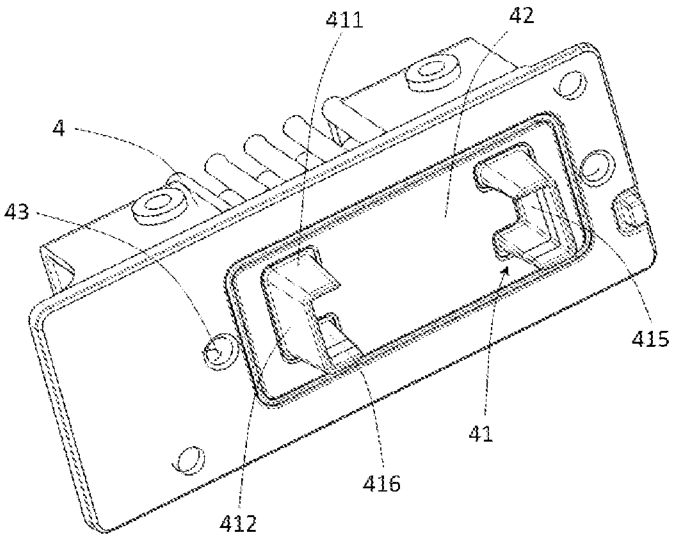
FIG. 7 is a structural schematic diagram of a radiator in an embodiment according to the present disclosure.
Figure 8:
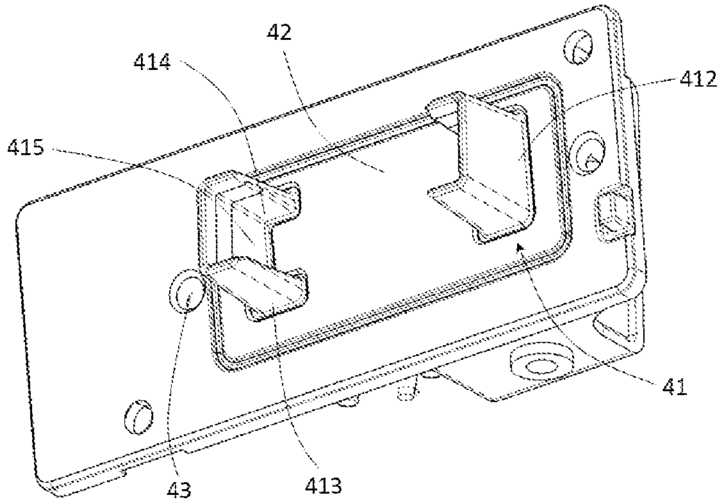
FIG. 8 is a schematic diagram in another viewing angle of FIG. 7.
Figure 9:
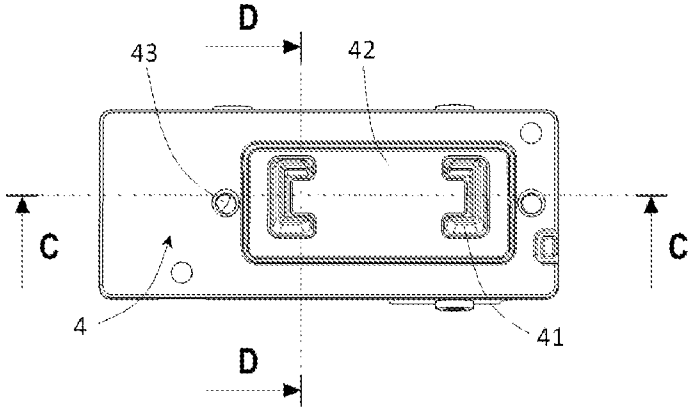
FIG. 9 is a front view of a radiator in an embodiment according to the present disclosure.
Figure 10:
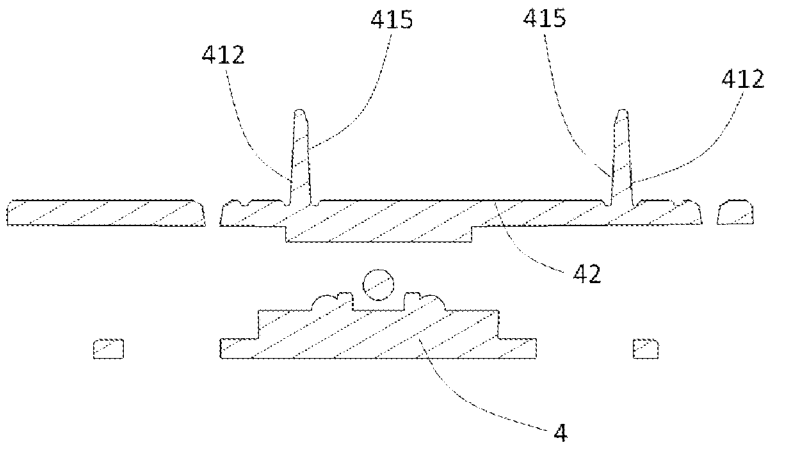
FIG. 10 is a section view taken in a direction C-C in FIG. 9.
Figure 11:
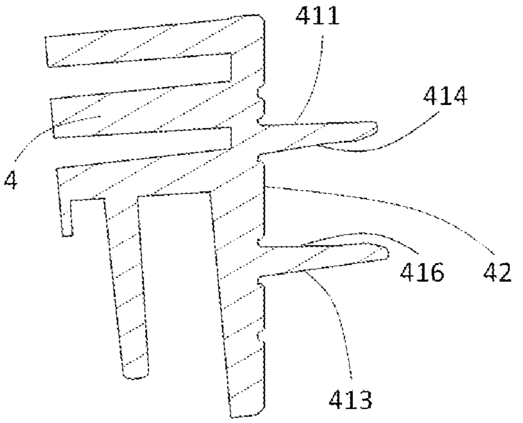
FIG. 11 is a section view in a direction D-D of FIG. 9.
Figure 12:
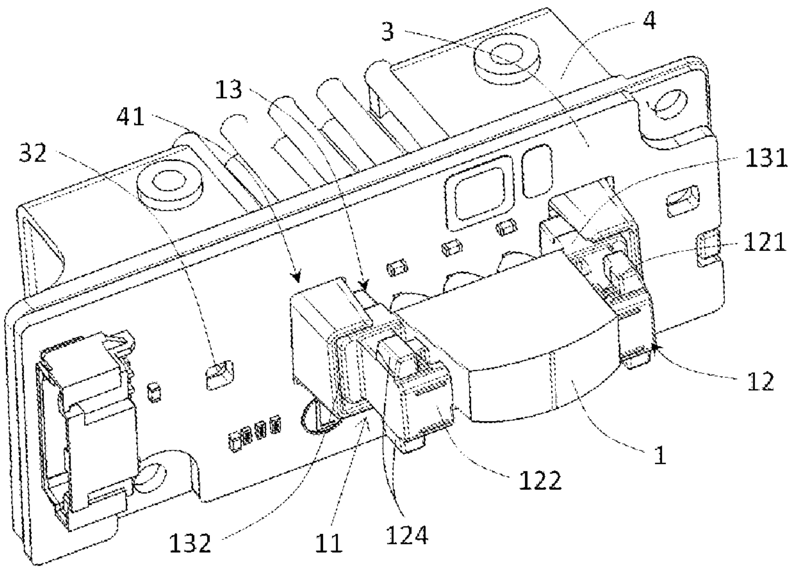
FIG. 12 is a schematic diagram showing an assembly state of a primary optical element, a circuit board and a radiator in an embodiment according to the present disclosure.
Figure 13:
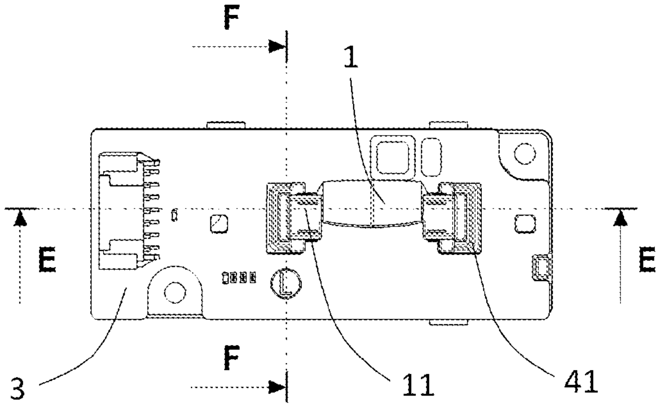
FIG. 13 is a front view of FIG. 12.
Figure 14:
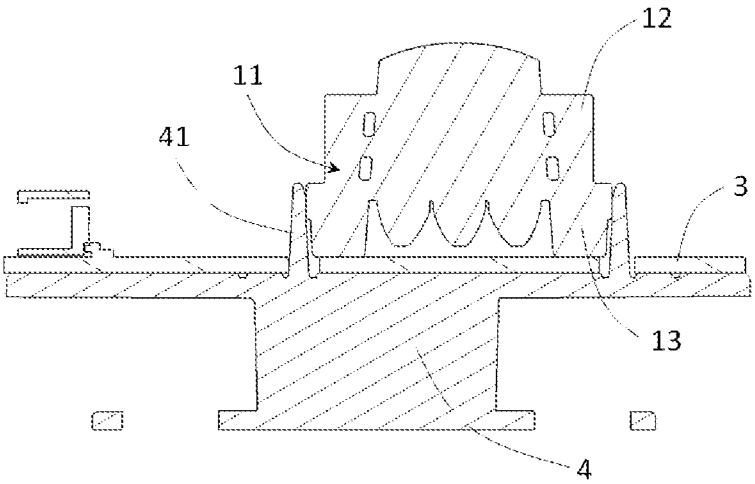
FIG. 14 is a section view in a direction E-E of FIG. 13.
Figure 15:
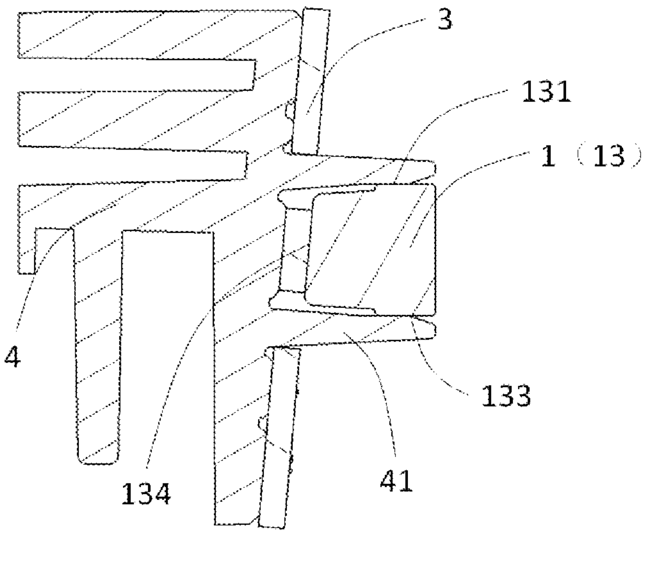
FIG. 15 is a section view in a direction F-F of FIG. 13.
Figure 16:
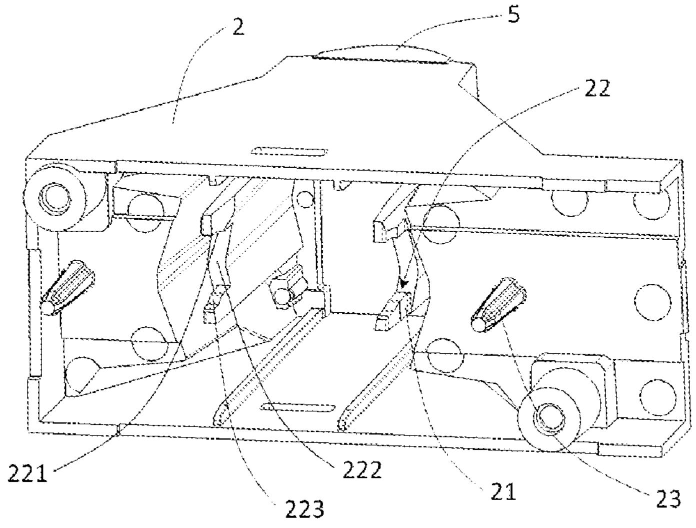
FIG. 16 is a structural schematic diagram of a lens mount in an embodiment according to the present disclosure.
Figure 17:
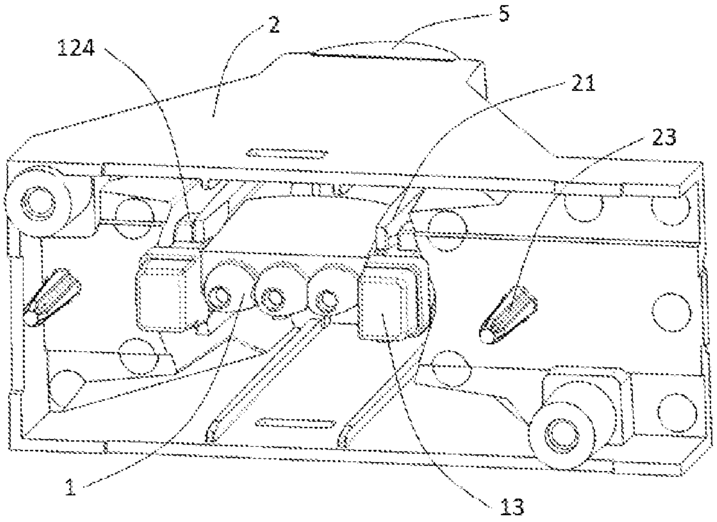
FIG. 17 is a schematic diagram showing an assembly state of a primary optical element and a lens mount in an embodiment according to the present disclosure.
Figure 18:
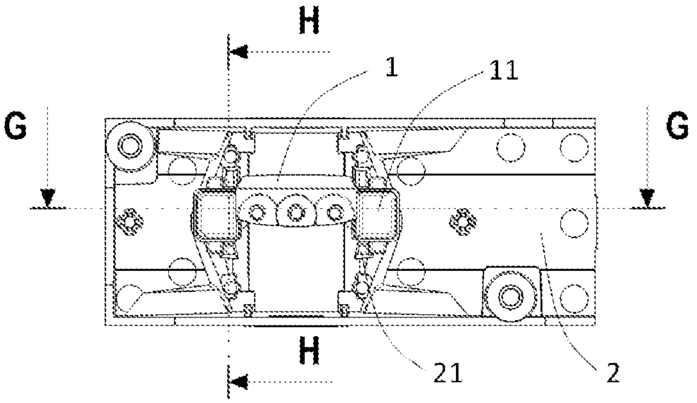
FIG. 18 is a rear view of FIG. 17.
Figure 19:
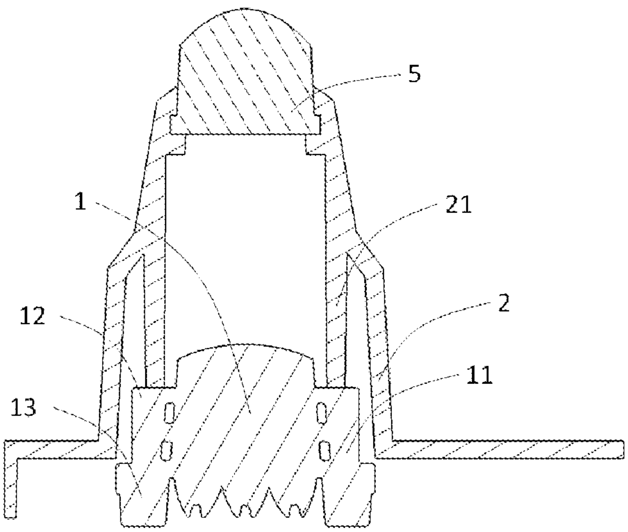
FIG. 19 is a section view in a direction G-G of FIG. 18.
Figure 20:
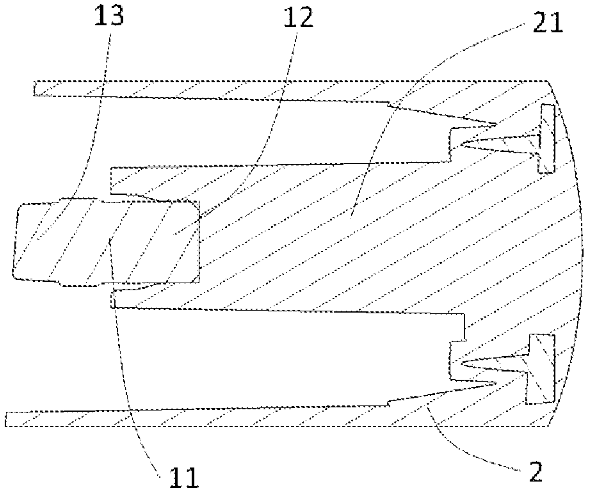
FIG. 20 is a section view in a direction H-H of FIG. 18.
Figure 21:
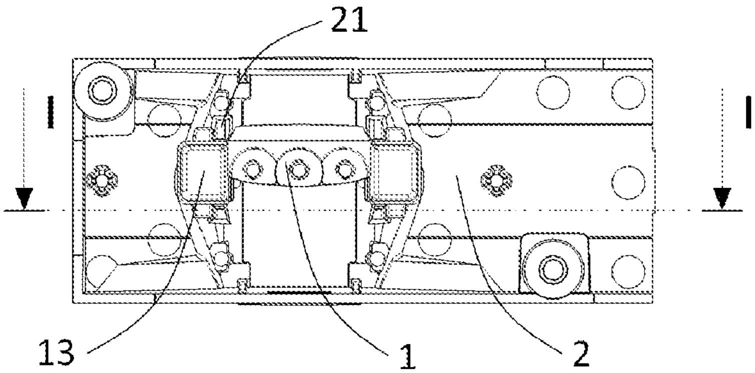
FIG. 21 is a rear view of FIG. 17.
Figure 22:
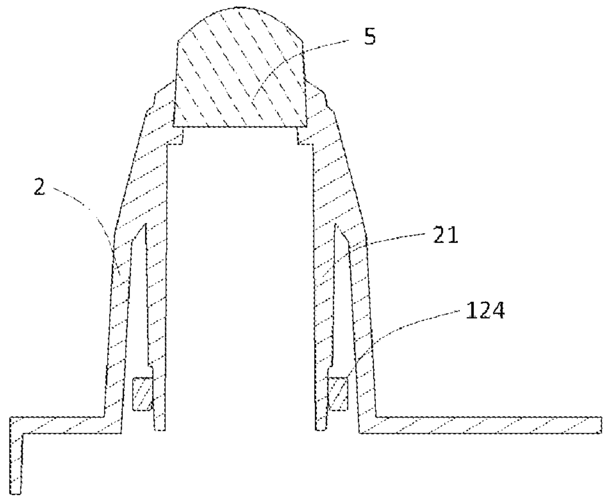
FIG. 22 is a section view in a direction I-I of FIG. 21.
Figure 23:
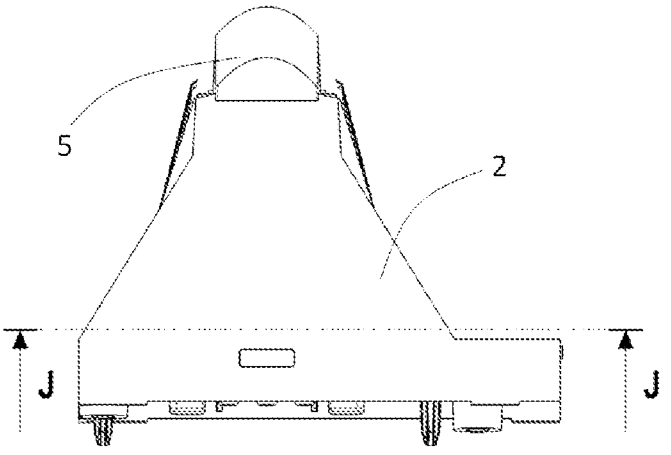
FIG. 23 is a top view of FIG. 17.
Figure 24:
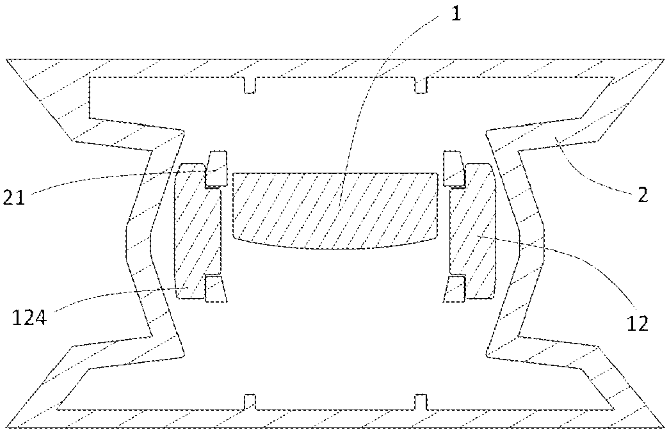
FIG. 24 is a section view in a direction J-J of FIG. 23.
Figure 25:
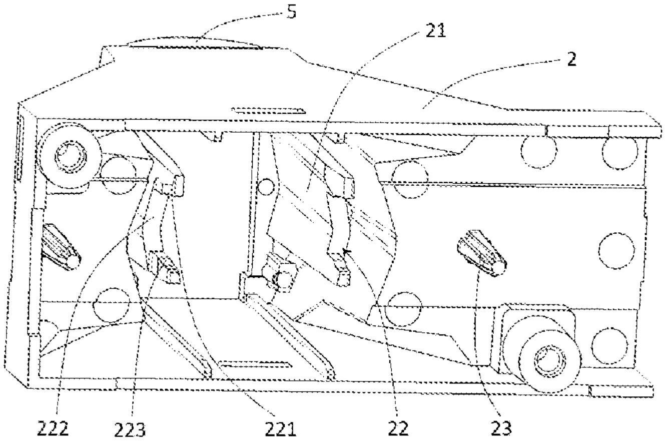
FIG. 25 is a structural schematic diagram of a lens mount in an embodiment according to the present disclosure.
Figure 26:
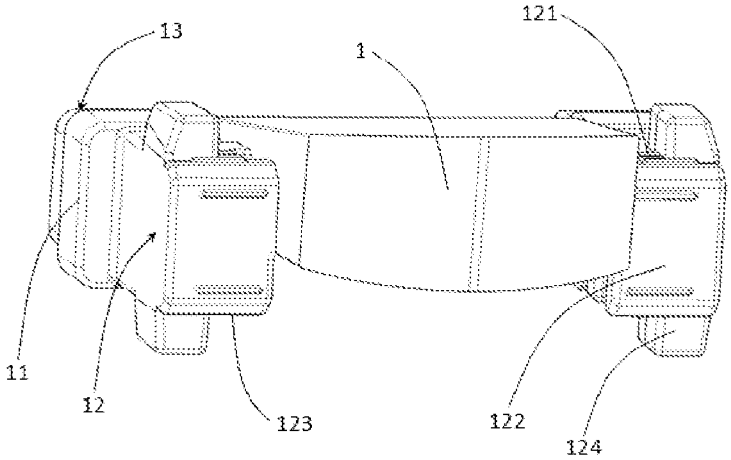
FIG. 26 is a structural schematic diagram of a primary optical element in an embodiment of the present disclosure.
Figure 27:
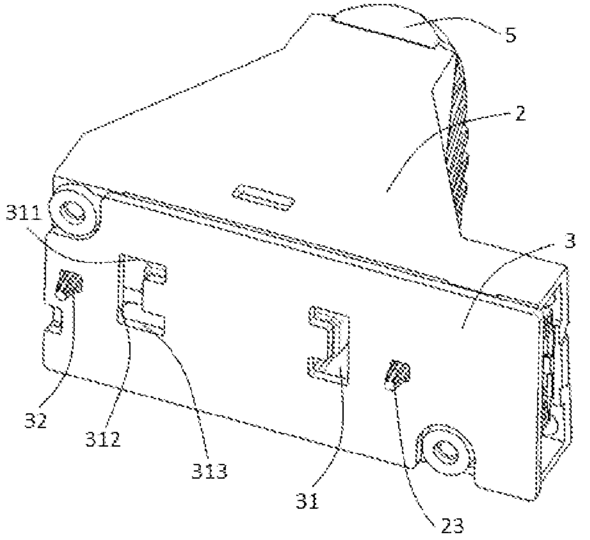
FIG. 27 is a schematic diagram showing an assembly state of a primary optical element, a lens mount, and a circuit board in an embodiment according to the present disclosure.

| | | | |
|---|---|---|---|
| 1 | primary optical element | 11 | mounting portion |
| 12 | front fitting portion | 121 | front upper fitting surface |
| 122 | front-end fitting surface | 123 | front lower fitting surface |
| 124 | side stopper | 13 | rear fitting portion |
| 131 | rear upper fitting surface | 132 | rear-side fitting surface |
| 133 | rear lower fitting surface | 134 | rear-end fitting surface |
| 2 | lens mount | 21 | primary element limiting frame |
| 22 | support groove | 221 | on-groove contact surface |
| 222 | in-groove contact surface | 223 | under-groove contact surface |
| 23 | positioning pin | 3 | circuit board |
| 31 | C-shaped positioning groove | 311 | positioning groove upper portion |
| 312 | positioning groove side portion | 313 | positioning groove lower portion |
| 32 | circuit board positioning hole | 4 | radiator |
| 41 | C-shaped limiting structure | 411 | upper circuit board limiting surface |
| 412 | outer circuit board limiting surface | 413 | lower circuit board limiting surface |
| 414 | upper element limiting surface | 415 | outer element limiting surface |
| 416 | lower element limiting surface | 42 | circuit board contact surface |
| 43 | radiator through hole | 5 | lens |

DETAILED DESCRIPTION OF THE EMBODIMENTS

In the present disclosure, the orientation or positional relationship indicated by the terms such as "front, rear, upper, lower, left, right" used without any contrary description is based on the orientation or positional relationship when a vehicle lamp lighting device of the present disclosure is actually used. The direction indicated by the position word "front" is a light-emitting direction of the vehicle lamp lighting device. The description of the optical assembly mounting structure of the present disclosure and the orientation or positional relationship of the vehicle lamp lighting and its components is consistent with the description of the mounting orientation in actual use.

In the description of the present disclosure, it should be noted that unless otherwise expressly specified and defined, the terms "mount", "arrange" or "connect" should be understood in a broad sense, for example, the term "connect" may be a fixed connection, a detachable connection, or an integrated connection, may be a direct connection or an indirect connection through an intermediate medium, and may be an internal communication of two elements or refers to an interaction relationship between the two elements. Those skilled in the art may understand the specific meanings of the above terms in the present disclosure according to specific conditions. The specific embodiments of the present disclosure will now be described in detail with reference to the drawings. It should be understood that the specific embodiments described herein are for describing and explaining the present disclosure only, and that the scope of the present disclosure is not limited to the specific embodiments described below.

As shown in FIG. 1-FIG. 27, an optical assembly mounting structure in an embodiment of the present disclosure includes a primary optical element 1, a lens mount 2, a circuit board 3 and a radiator 4. Mounting portions 11 are disposed on two sides of the primary optical element 1. Front ends of the mounting portions 11 are provided with front fitting portions 12, and are mounted on the lens mount 2 by the front fitting portions 12. Rear ends of the mounting portions 11 are provided with rear fitting portions 13, and are mounted on the radiator 4 by the rear fitting portions 13. Primary element limiting frames 21 are disposed inside the lens mount 2. A front end of the primary optical element 1 is fixed on the lens mount 2 by fitting of the primary element limiting frames 21 and the front fitting portions 12, thereby positioning and mounting the front end of the primary optical element 1 and the lens mount 2. Two C-shaped limiting structures 41 are disposed on the radiator 4, and openings of the two C-shaped limiting structures 41 are oppositely disposed. The circuit board 3 is provided with two C-shaped positioning grooves 31, the two C-shaped positioning grooves 31 are disposed at positions and orientations corresponding to the C-shaped positioning structures 41, such that the circuit board 3 may be mounted on the radiator 4 by fitting of the C-shaped positioning grooves 31 and the C-shaped positioning structures 41, thereby mounting and positioning the circuit board 3 and the radiator 4. Meanwhile, a rear end of the primary optical element 1 is mounted on the radiator 4 by fitting of the rear fitting portions 13 and the C-shaped limiting structures 41, thereby mounting and positioning the rear end of the primary optical element 1 and the radiator 4. A mounting structure that the front end and the rear end of the primary optical element 1 are mounted and positioned together with the lens mount 2 and the radiator 4 respectively improves the mounting and positioning stability and positioning accuracy of the primary optical element 1 greatly. A mounting structure that the primary optical element 1 and the circuit board 3 are positioned using the two C-shaped limiting structures 41 improves the mounting and positioning accuracy between the circuit board 3 and the primary optical element 1 and between a light source mounted on the circuit board 3 and the primary optical element 1.

In some embodiments of the optical assembly mounting structure of the present disclosure, as shown in FIG. 6, FIG. 16 to FIG. 25, two primary element limiting frames 21 are provided, and the two primary element limiting frames 21 are disposed on two sides of a lens mounting position on the lens mount 2, respectively. The two primary element limiting frames 21 are disposed at positions corresponding to positions of the front fitting portions 12 on the primary optical element 1. Moreover, rear ends of the primary element limiting frames 21 are provided with support grooves 22, and the front end of the primary optical element 1 is mounted on the lens mount 2 by fitting of the front fitting portions 12 and the support grooves 22. The front end of the primary optical element 1 may be mounted and positioned from two sides of the primary optical element 1 by the support grooves 22 in the two primary element limiting frames 21, producing higher mounting and positioning precision and stability.

In some embodiments of the optical assembly mounting structure of the present disclosure, as shown in FIG. 6, and FIGS. 16-25, the support groove 22 is a square bayonet groove. An upper bayonet portion of the support groove 22 is an on-groove contact surface 221, an inner bayonet portion is an in-groove contact surface 222, and a lower bayonet portion is an under-groove contact surface 223. Each front fitting portion 12 is in a square fitting structure. An upper side surface of the fitting structure is a front upper fitting surface 121, a front side surface of the fitting structure is a front-end fitting surface 122, and a lower side surface of the fitting structure is a front lower fitting surface 123. When the front fitting portion 12 is mounted in the support groove 22, the front upper fitting surface 121 is in contact with the on-groove contact surface 221 to limit an upward movement of the front end of the primary optical element 1. The front-end fitting surface 122 is in contact with the in-groove contact surface 222 to limit a forward movement of the primary optical element 1. The front lower fitting surface 123 is in contact with the under-groove contact surface 223 to limit a downward movement of the front end of the primary optical element 1. The three fitting surfaces form accurate, stable mounting and positioning between the front fitting portion 12 and the support groove 22. Small tooth-like structures may also be provided on the on-groove contact surface 221, the in-groove contact surface 222 and the under-groove contact surface 223 to improve the tightness and stability of the fitting with the front fitting portion 12. The front upper fitting surface 121, the front-end fitting surface 122, and the front lower fitting surface 123 may also be provided with fitting structures such as fitting stripes for improving fitting stability.

In a specific embodiment of the optical assembly mounting structure of the present disclosure, as shown in FIGS. 17-26, side stoppers 124 are disposed on an upper side surface and a lower side surface of each front fitting portion 12 respectively. When the front fitting portions 12 are mounted in the support grooves 22, the side stoppers 124 on the two front fitting portions 12 are positioned on the outsides of the primary element limiting frames 21 and make contact with the primary element limiting frames 21. An inner side surface of each side stopper 124 may also be provided with a positioning surface to improve positioning accuracy. Similarly, positioning surfaces may be disposed at opposite positions outside portions of the primary element limiting frames 21 above and below the support grooves 22, to limit a movement of the front end of the primary optical element 1 in a left-right direction, or clamping surfaces are disposed at opposite positions outside portions of the primary element limiting frames 21 above and below the support grooves 22 to simultaneously limit the movement of the front end of the primary optical element 1 in the left-right direction and the movement of the primary optical element 1 in a front-rear direction, further improving the mounting positioning accuracy and the mounting positioning stability.

In some embodiments of the optical assembly mounting structure of the present disclosure, as shown in FIGS. 2-15 and FIG. 27, outer side surfaces of the C-shaped limiting structures 41 are provided with upper circuit board limiting surfaces 411 on upper side surfaces, outer circuit board limiting surfaces 412 on outer side surfaces, and lower circuit board limiting surfaces 413 on lower side surfaces, respectively. The C-shaped positioning groove 31 includes a positioning groove upper portion 311, a positioning groove side portion 312 and a positioning groove lower portion 313. When the circuit board 3 is mounted on the C-shaped limiting structures 41, the upper circuit board limiting surfaces 411 are in contact with upper side walls of the positioning groove upper portions 311 to limit a downward movement of the circuit board 3 relative to the C-shaped limiting structures 41. The outer board limiting surfaces 412 are in contact with outer side walls of the positioning groove side portions 312 to limit a left-right movement of the circuit board 3 relative to the C-shaped limiting structures 41. The lower circuit board limiting surfaces 413 are in contact with lower side walls of the positioning groove lower portions 313 to limit an upward movement of the circuit board 3 relative to the C-shaped limiting structures 41. Therefore, three sides of the C-shaped positioning groove 31 are in contact with three sides of the outer side of each C-shaped positioning structure 41, and the movement between the circuit board 3 and the C-shaped positioning structures 41 in the up-down direction and the left-right direction is limited, thereby improving the mounting positioning accuracy and stability between the circuit board 3 and the radiator 4.

In a specific embodiment of the optical assembly mounting structure of the present disclosure, as shown in FIGS. 7-11, a circuit board contact surface 42 is disposed on the radiator 4, and the C-shaped limiting structures 41 are disposed in the circuit board contact surface 42. When the circuit board 3 is mounted on the C-shaped limiting structures 41, a rear surface of the circuit board 3 is in close contact with the circuit board contact surface 42. Due to the close contact between the circuit board 3 and the circuit board contact surface 42, heat emitted from a light source mounted on the circuit board 3 may be better transferred to the radiator 4 on the one hand, improving the heat dissipation effect of the light source. Backward positioning of the circuit board 3 can be achieved on the other hand, improving the positioning accuracy of the circuit board 3 and the light source mounted on the circuit board 3.

In some embodiments of the optical assembly mounting structure of the present disclosure, as shown in FIGS. 2-15, inner side surfaces of each C-shaped limiting structure 41 on the radiator 4 is provided with an upper element limiting surface 414 on the upper side, an outer element limiting surface 415 on the outer side, and a lower element limiting surface 416 on the lower side, respectively. The upper side surface of the upper rear fitting portion 13 of the primary optical element 1 is provided as a rear upper fitting surface 131, the outer side surface is provided as a rear-side fitting surface 132, the lower side surface is provided as a rear lower fitting surface 133, and the rear end surface is provided as a rear-end fitting surface 134. When the rear fitting portions 13 are mounted in the C-shaped limiting structures 41, the upper element limiting surfaces 414 limit the rear upper fitting surfaces 131, thereby limiting an upward movement of the rear end of the primary optical element 1. The outer element limiting surfaces 415 limit the rear-side fitting surfaces 132, thereby limiting a movement of the rear end of the primary optical element 1 in the left-right direction. The lower element limiting surfaces 416 limit the rear lower fitting surfaces 133, thereby limiting a downward movement of the rear end of the primary optical element 1. Moreover, the rear-end fitting surfaces 134 are limited by the circuit board 3, thereby limiting a backward movement of the primary optical element 1. In this way, the multi-directional limitation is performed on the rear fitting portions 13, and meanwhile, movement between the primary optical element 1 and the C-shaped limiting structures 41 in the up-down direction, left-right direction, and backward direction is limited, thereby greatly improving the mounting and positioning accuracy and stability of the rear end of the primary optical element 1. Similarly, the rear upper fitting surfaces 131, the rear-side fitting surfaces 132, the rear lower fitting surfaces 133, and the rear-end fitting surfaces 134 may be provided with fitting structures such as fitting stripes for improving the fitting accuracy and fitting stability. In some embodiments of the optical assembly mounting structure of the present disclosure, as shown in FIGS. 1-5, the front end of the lens mount 2 is provided with a lens mounting opening at which a lens 5 is fixedly connected. Specifically, the shape of the lens 5 may be freely designed according to the styling requirements of the vehicle lamp, and the shape of the lens mounting opening is adapted to the mounting shape of the lens 5. The lens 5 may be fixed at the lens mounting opening by a connecting member such as a mounting cover plate, or may be fixed at the lens mounting opening by welding, gluing, or other manners to form a mounting connection of the lens 5 and the lens mount 2, and to guarantee the mounting accuracy of the lens 5.

As a specific embodiment of the optical assembly mounting structure of the present disclosure, the lens 5 is integrally formed at the lens mounting opening to form an integral structure of the lens 5 and the lens mount 2. Specifically, the lens 5 and the lens mount 2 may be integrally molded in a double-colored injection molding manner. Due to the integral structure of the lens 5 and the lens mount 2, the positioning accuracy of the lens 5 is only affected by a molding mold, and the positioning accuracy of the lens 5 is higher.

In some embodiments of the optical assembly mounting structure of the present disclosure, as shown in FIGS. 16-27, the lens mount 2 is provided with positioning pins 23, circuit board positioning holes 32 are formed in the circuit board 3, and the radiator 4 is provided with radiator through holes 43. The precise positioning between the lens mount 2 and the circuit board 3 is formed by fitting of the positioning pins 23 and the circuit board positioning holes 32, the radiator through hole 43 form an accommodating space for the positioning pin 23, and the higher positioning accuracy between the lens mount 2 and the circuit board 3 is guaranteed, thereby guaranteeing the positioning accuracy of the primary optical element 1, the lens 5 and the light source mounted on the circuit board 3. The above positioning structure together with the positioning structure between the primary optical element 1 and the primary element limiting frames 21, the positioning structure between the primary optical element 1 and the C-shaped limiting structures 41, the positioning structure between the circuit board 3 and the C-shaped limiting structures 41 forms accurate and stable positioning of the light source, the primary optical element 1 and the lens 5 from a plurality of aspects, thereby improving the precision of the mounting and accuracy of an optical assembly and the stability of the mounting structure.

Figure 28:
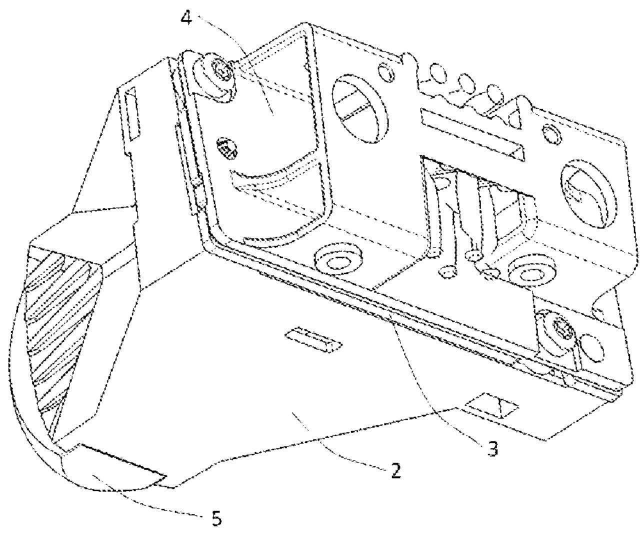
FIG. 28 is a general view of a vehicle lamp lighting device in an embodiment according to the present disclosure.

A mounting assembly of the vehicle lamp lighting device of the present is as shown in FIG. 28. Due to the use of the optical assembly mounting structure of any one of the embodiments, the mounting structure is simple, and the vehicle lamp lighting device may be designed to be smaller. Moreover, the optical assembly has higher positioning accuracy, and more stable and reliable mounting and positioning may be achieved.

The vehicle of the present disclosure also has the above advantages due to the use of the vehicle lamp since the vehicle lamp uses the vehicle lamp lighting device of the present disclosure.

In addition, it should be noted that although the optical assembly mounting structure of the present disclosure is designed for a small-sized vehicle lamp lighting device, the technical solutions of the present disclosure are applicable to not only a small-sized vehicle lamp lighting device but also a large-sized vehicle lamp lighting device.

In the description of the present disclosure, descriptions with reference to the terms "one embodiment", "some embodiments", "a specific embodiment", or the like mean that specific features, structures, materials, or characteristics described in combination with the embodiments or examples are included in at least one embodiment or example of the present disclosure. In the present disclosure, illustrative representations of the above terms do not necessarily refer to the same embodiment or example. Furthermore, the specific features, structures, materials, or characteristics described may be combined in any suitable manner in one or more embodiments or examples.

The preferred embodiments of the present disclosure are described in detail above in combination with the drawings, but the present disclosure is not limited thereto. Various simple variations may be made to the technical solutions of the present disclosure within the scope of the technical concept of the present disclosure, including various specific technical features that are combined in any suitable manner, and the various possible combinations of the present disclosure are not additionally described in order to avoid unnecessary repetitions. However, such simple variations and combinations are to be considered as content disclosed herein and are intended to be within the scope of the present disclosure.

The invention claimed is:

1. An optical assembly mounting structure, comprising a primary optical element, a lens mount, a circuit board and a radiator, wherein mounting portions are disposed on the left and right sides of the primary optical element, and each of the mounting portions comprise a front fitting portion located at a front end and a rear fitting portion located at a rear end; primary element limiting frames are disposed in the lens mount; two oppositely disposed C-shaped limiting structures are disposed on the radiator, and two C-shaped positioning grooves are formed in the circuit board; the circuit board is mounted on the radiator by fitting of the C-shaped positioning grooves and the C-shaped limiting structures; a rear end of the primary optical element is mounted on the radiator by fitting of the rear fitting portions and the C-shaped limiting structures, and a front end of the primary optical element is mounted on the lens mount by fitting of the front fitting portions and the primary element limiting frames.

2. The optical assembly mounting structure according to claim 1, wherein the number of the primary element limiting frames is two primary element limiting frames, and the two primary element limiting frames are disposed on the left and right sides of a lens mounting position on the lens mount separately; a support groove is formed in a rear end of each of the primary element limiting frames corresponding to a position of the front fitting portion, and the front fitting portions is mounted on the support groove.

3. The optical assembly mounting structure according to claim 2, wherein each said support groove comprises a groove upper contact surface, a groove inside contact surface, a groove lower contact surface, and a side stopper; each front fitting portion comprises a front upper fitting surface, a front-end fitting surface, and a front lower fitting surface; and the front upper fitting surface is in contact with the groove upper contact surface, the front-end fitting surface is in contact with the groove inside contact surface, and the front lower fitting surface is in contact with the groove lower contact surface, the side stopper is positioned on the outside of the primary element limiting frame and is in contact with the primary element limiting frame.

4. The optical assembly mounting structure according to claim 1, wherein an outer side of each the C-shaped limiting structure comprises an upper circuit board limiting surface, an outer circuit board limiting surface and a lower circuit board limiting surface; the C-shaped positioning groove comprises a positioning groove upper portion, a positioning groove side portion and a positioning groove lower portion; the upper circuit board limiting surface is in contact with an upper side wall of the positioning groove upper portion, the outer circuit board limiting surface is in contact with an outer side wall of the positioning groove side portion, and the lower circuit board limiting surface is in contact with a lower side wall of the positioning groove lower portion.

5. The optical assembly mounting structure according to claim 4, wherein a circuit board contact surface is disposed on the radiator, the C-shaped limiting structures are disposed on the circuit board contact surface, and the circuit board is in contact with the circuit board contact surface.

6. The optical assembly mounting structure according to claim 1, wherein an inner side of each of the C-shaped limiting structures comprises an upper element limiting surface, an outer element limiting surface and a lower element limiting surface; the rear fitting portion comprises a rear upper fitting surface, a rear-side fitting surface, a rear lower fitting surface and a rear-end fitting surface; the rear upper fitting surface is in contact with the upper element limiting surface, and the rear-side fitting surface is in contact with the outer element limiting surface; the rear lower fitting surface is in contact with the lower element limiting surface, and the rear-end fitting surface is in contact with the circuit board.

7. The optical assembly mounting structure according to claim 1, wherein the lens mount comprises a lens mounting opening and positioning pins, the lens is fixedly connected to the lens mounting opening, the lens is integrally formed with the lens mount, and the circuit board is provided with circuit board positioning holes in which the positioning pins are mounted.

8. A vehicle lamp lighting device, comprising the optical assembly mounting structure according to claim 1.

9. A vehicle lamp, comprising the vehicle lamp lighting device according to claim 8.

10. The vehicle lamp lighting device according to claim 8, wherein the number of the primary element limiting frames is two primary element limiting frames, and the two primary element limiting frames are disposed on the left and right sides of a lens mounting position on the lens mount separately; a support groove is formed in a rear end of each of the primary element limiting frames corresponding to a position of the front fitting portion, and the front fitting portions is mounted on the support grooves.

11. The vehicle lamp lighting device according to claim 10, wherein each said support a groove comprises a groove upper contact surface, a groove inside contact surface, a groove lower contact surface, and a side stopper; each front fitting portion comprises a front upper fitting surface, a front-end fitting surface, and a front lower fitting surface; and the front upper fitting surface is in contact with the groove upper contact surface, the front-end fitting surface is in contact with the groove inside contact surface, and the front lower fitting surface is in contact with the groove lower contact surface, the side stopper is positioned on the outside of the primary element limiting frame and is in contact with the primary element limiting frame.

12. The vehicle lamp lighting device according to claim 8, wherein an outer side of each the C-shaped limiting structure comprises an upper circuit board limiting surface, an outer circuit board limiting surface and a lower circuit board limiting surface; the C-shaped positioning groove comprises a positioning groove upper portion, a positioning groove side portion and a positioning groove lower portion; the upper circuit board limiting surface is in contact with an upper side wall of the positioning groove upper portion, the outer circuit board limiting surface is in contact with an outer side wall of the positioning groove side portion, and the lower circuit board limiting surface is in contact with a lower side wall of the positioning groove lower portion.

13. The vehicle lamp lighting device according to claim 12, wherein a circuit board contact surface is disposed on the radiator, the C-shaped limiting structures are disposed on the circuit board contact surface, and the circuit board is in contact with the circuit board contact surface.

14. The vehicle lamp lighting device according to claim 8, wherein an inner side of each of the C-shaped limiting structures comprises an upper element limiting surface, an outer element limiting surface and a lower element limiting surface; the rear fitting portion comprises a rear upper fitting surface, a rear-side fitting surface, a rear lower fitting surface and a rear-end fitting surface; the rear upper fitting surface is in contact with the upper element limiting surface, and the rear-side fitting surface is in contact with the outer element limiting surface; the rear lower fitting surface is in contact with the lower element limiting surface, and the rear-end fitting surface is in contact with the circuit board.

15. The vehicle lamp lighting device according to claim 8, wherein the lens mount comprises a lens mounting opening and positioning pins, the lens is fixedly connected to the lens mounting opening, the lens is integrally formed with the lens mount, and the circuit board is provided with circuit board positioning holes in which the positioning pins are mounted.

16. The vehicle lamp according to claim 9, wherein the number of the primary element limiting frames is two primary element limiting frames, and the two primary element limiting frames are disposed on the left and right sides of a lens mounting position on the lens mount separately; a support groove is formed in a rear end of each of the primary element limiting frames corresponding to a position of the front fitting portion, and the front fitting portions is mounted on the support grooves.

17. The vehicle lamp according to claim 16, wherein each said support groove comprises a groove upper contact surface, a groove inside contact surface, a groove lower contact surface, and a side stopper; each front fitting portion comprises a front upper fitting surface, a front-end fitting surface, and a front lower fitting surface; and the front upper fitting surface is in contact with the groove upper contact surface, the front-end fitting surface is in contact with the groove inside contact surface, and the front lower fitting surface is in contact with the groove lower contact surface, the side stopper is positioned on the outside of the primary element limiting frame and is in contact with the primary element limiting frame.

18. The vehicle lamp according to claim 9, wherein an outer side of each the C-shaped limiting structure comprises an upper circuit board limiting surface, an outer circuit board limiting surface and a lower circuit board limiting surface; the C-shaped positioning groove comprises a positioning groove upper portion, a positioning groove side portion and a positioning groove lower portion; the upper circuit board limiting surface is in contact with an upper side wall of the positioning groove upper portion, the outer circuit board limiting surface is in contact with an outer side wall of the positioning groove side portion, and the lower circuit board limiting surface is in contact with a lower side wall of the positioning groove lower portion, and a circuit board contact surface is disposed on the radiator, the C-shaped limiting structures are disposed on the circuit board contact surface, and the circuit board is in contact with the circuit board contact surface.

19. The vehicle lamp according to claim 9, wherein an inner side of each of the C-shaped limiting structures comprises an upper element limiting surface, an outer element limiting surface and a lower element limiting surface; the rear fitting portion comprises a rear upper fitting surface, a rear-side fitting surface, a rear lower fitting surface and a rear-end fitting surface; the rear upper fitting surface is in contact with the upper element limiting surface, and the rear-side fitting surface is in contact with the outer element limiting surface; the rear lower fitting surface is in contact with the lower element limiting surface, and the rear-end fitting surface is in contact with the circuit board.

20. The vehicle lamp according to claim 9, wherein the lens mount comprises a lens mounting opening and positioning pins, the lens is fixedly connected to the lens mounting opening, the lens is integrally formed with the lens mount, and the circuit board is provided with circuit board positioning holes in which the positioning pins are mounted.

* * * * *